United States Patent
Yi et al.

(10) Patent No.: US 11,186,286 B2
(45) Date of Patent: Nov. 30, 2021

(54) METHOD FOR ESTIMATING ROAD SURFACE FRICTION COEFFICIENT OF TIRE AND DEVICE FOR ESTIMATING ROAD SURFACE FRICTION COEFFICIENT OF TIRE IN HIGH SPEED NORMAL DRIVING STATE

(71) Applicant: SEOUL NATIONAL UNIVERSITY R&DB FOUNDATION, Seoul (KR)

(72) Inventors: Kyongsu Yi, Seoul (KR); Taewoo Kim, Seoul (KR); Hotae Seo, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 86 days.

(21) Appl. No.: 16/483,545

(22) PCT Filed: Feb. 6, 2018

(86) PCT No.: PCT/KR2018/001543
§ 371 (c)(1),
(2) Date: Aug. 5, 2019

(87) PCT Pub. No.: WO2018/143759
PCT Pub. Date: Aug. 9, 2018

(65) Prior Publication Data
US 2020/0023852 A1    Jan. 23, 2020

(30) Foreign Application Priority Data
Feb. 6, 2017 (KR) .................. 10-2017-0016325

(51) Int. Cl.
*B60W 40/068* (2012.01)
*B60W 30/18* (2012.01)
(Continued)

(52) U.S. Cl.
CPC .......... *B60W 40/068* (2013.01); *B60W 30/18* (2013.01); *B60W 40/076* (2013.01);
(Continued)

(58) Field of Classification Search
CPC .................................................. B60W 40/068
See application file for complete search history.

(56) References Cited

U.S. PATENT DOCUMENTS

2005/0038588 A1*   2/2005   Shukla .................. B60T 8/1755
                                                         701/70
2005/0038589 A1*   2/2005   Shukla .................... B60T 8/172
                                                          701/80
(Continued)

FOREIGN PATENT DOCUMENTS

| JP | H07-101258 A | 4/1995 |
|---|---|---|
| KR | 10-2016-0048376 A | 5/2016 |
| WO | 2010/001819 A | 1/2010 |

OTHER PUBLICATIONS

Jae-Young Park, Woojin Shim, and Seung-Jin Heo, A Study of Tire Road Friction Estimation for Controlling Rear Wheel Driving Force of 4WD Vehicle, Transaction of the Korean Society of Automotive Engineers, Sep. 2016, pp. 512-519, vol. 24, No. 5, The Korean Society of Automotive Engineers.
(Continued)

*Primary Examiner* — Imran K Mustafa
(74) *Attorney, Agent, or Firm* — KORUS Patent, LLC; Seong Il Jeong

(57) ABSTRACT

The present invention relates to a method and device for estimating the road surface friction coefficient of a tire, which estimate the road surface friction coefficient of a tire mounted on a wheel of a vehicle in a state in which the vehicle is normally running at high speed. The method includes: acquiring the state information of a vehicle including at least one of engine state information, transmission
(Continued)

state information, and chassis state information from sensors mounted on the vehicle and specifications set for the vehicle; estimating a longitudinal slip ratio, normal force, and longitudinal force for a tire mounted on each wheel of the vehicle by using the acquired state information of the vehicle; and estimating a road surface friction coefficient for the tire by using the estimated longitudinal slip ratio, normal force, and longitudinal force.

8 Claims, 11 Drawing Sheets

(51) Int. Cl.
*B60W 40/076* (2012.01)
*B60W 40/105* (2012.01)

(52) U.S. Cl.
CPC ....... *B60W 40/105* (2013.01); *B60W 2510/06* (2013.01); *B60W 2510/10* (2013.01); *B60W 2520/10* (2013.01); *B60W 2520/26* (2013.01); *B60W 2530/10* (2013.01); *B60W 2552/15* (2020.02); *B60W 2552/40* (2020.02)

(56) References Cited

U.S. PATENT DOCUMENTS

| | | | |
|---|---|---|---|
| 2009/0012669 A1* | 1/2009 | Takenaka | B60W 10/10 701/31.4 |
| 2010/0077847 A1* | 4/2010 | Joe | B60W 40/101 73/146 |
| 2010/0114449 A1* | 5/2010 | Shiozawa | B60T 8/172 701/90 |
| 2011/0209521 A1* | 9/2011 | Shiozawa | B60L 15/2036 73/9 |
| 2011/0264300 A1* | 10/2011 | Tuononen | G01M 17/02 701/1 |

OTHER PUBLICATIONS

Kihong Park, Seung-Jin Heo, Inho Paik, and Kyongsu Yi, Estimator Design for Road Friction Coefficient and Body Sideslip Angle for Use in Vehicle Dynamics Control Systems, Transaction of the Korean Society of Automotive Engineers, Mar. 2001, pp. 176-184, vol. 9, No. 2, The Korean Society of Automotive Engineers.

Rajesh Rajamani et al., "Algorithms for Real-Time Estimation of Individual Wheel Tire-Road Friction Coefficients", Proceeding of the American Control Conference, Jun. 14-16, 2006, pp. 4682-4687, XP010929745, 2006 Minneapolis, MN, USA, DOI: 10.1109/ACC.2006.1657460, ISBN: 978-1-4244-0209-0.

Rajesh Rajamani et al., "Algorithms for Real-Time Estimation of Individual Wheel Tire-Road Friction Coefficients", IEEE/ASME Transactions on Mechatronics, IEEE Service Center, Dec. 1, 2012 (Dec. 1, 2012), pp. 1183-1195, vol. 17, No. 6, XP011458902, ISSN: 1083-4435, DOI: 10.1109/TMECH.2011.2159240.

Guan Hsin et al., "Identification of maximum road friction coefficient and optimal slip ratio based on road type recognition", Chinese Journal of Mechanical Engineering : The Official Journal of the Chinese Mechanical Engineering Society, Zhongguo-Jixie-Gongcheng-Xuehui, CN, vol. 27, No. 5, Aug. 23, 2014 (Aug. 23, 2014), pp. 1018-1026, XP036263211, ISSN: 1000-9345, DOI: 10.3901 /CJME.2014.0725.128.

Sun Fei et al., "Vehicle state estimation for anti-lock control with nonlinear observer", Control Engineering Practice, Pergamon Press, Oxford, GB, vol. 43, Jul. 20, 2015 (Jul. 20, 2015), pp. 69-84, XP029257780, ISSN: 0967-0661, DOI: 10.1016/J.CONENGPRAC.2015.07.003.

Yang Juan et al., "Adaptive estimation of road gradient and vehicle parameters for vehicular systems", IET Control Theory and Applications, The Institution of Engineering and Technology, GB, vol. 9, No. 6, Apr. 13, 2015 (Apr. 13, 2015), pp. 935-943, XP006051915, ISSN: 1751-8644, DOI: 10.1049/IET-CTA.2014.0335.

Wanki Cho et al., "Estimation of Tire Forces for Application to Vehicle Stability Control", IEEE Transactions on Vehicular Technology, IEEE Service Center, Piscataway, NJ, US, vol. 59, No. 2, Feb. 1, 2010 (Feb. 1, 2010), pp. 638-649, XP011296348, ISSN: 0018-9545.

\* cited by examiner

METHOD FOR ESTIMATING ROAD SURFACE FRICTION COEFFICIENT OF TIRE AND DEVICE FOR ESTIMATING ROAD SURFACE FRICTION COEFFICIENT OF TIRE IN HIGH SPEED NORMAL DRIVING STATE

TECHNICAL FIELD

The present invention relates to a method and device for estimating the road surface friction coefficient of a tire of a vehicle, and more specifically to a method and device for estimating the road surface friction coefficient of a tire, which are capable of estimating a friction coefficient by using longitudinal propulsive force even in a high speed normal driving state, which is a state in which braking pressure or steering is minimized.

BACKGROUND ART

Recently, various driver assistance systems have been developed in order to improve stability during driving or to prevent a slip during braking or sudden acceleration. Ultimately, autonomous driving technology by which a vehicle can autonomously drive itself has been developed.

In the above-described technology, information about the friction coefficient of a running vehicle is one of the pieces of important information for stably maintaining the posture of the vehicle.

For example, the friction between a road surface wet with rain or fog or road surface covered with snow and a tire becomes small. When the friction becomes small, the road surface is slippery compared to a dry road surface. Accordingly, slips occur between the tire and the road surface. In contrast, the friction between a dry road surface and a tire becomes large, in which case few slips occur.

Generally, the road surface friction coefficient of a tire is an important value which determines vehicle behavior limits in hazardous situations, such as a situation in which a vehicle slips or brakes abruptly, or the like. Accordingly, in recent years, various studies have been actively conducted to estimate a friction coefficient between a tire and a road surface based on various types of state information of a vehicle and to apply it to a driver assistance system or autonomous driving technology.

However, in the case of conventional technologies for estimating the road surface friction coefficient of a tire, an amount of information, such as longitudinal slip ratios and lateral slip angles, equal to or larger than a predetermined amount is required to estimate the friction coefficient. For this purpose, braking pressure or steering of a level higher than that used during normal driving is required.

Accordingly, conventionally, there is a limitation in that a friction coefficient can be estimated only when sudden control is performed in the case where a vehicle slips, brakes abruptly, or the like.

For example, in the method for estimating a friction coefficient disclosed in Korean Patent No. 10-1540902, a problem arises in that a friction coefficient is estimated only when the brakes of a vehicle are pressed.

However, in particular, in order to secure safety in an environment such as an autonomous driving system or the like, there is a need to determine the friction coefficient of a tire before a vehicle enters a dangerous situation and to respond quickly to the dangerous situation based on it.

Meanwhile, the above-described background technology corresponds to technical information that has been possessed by the present inventor in order to contrive the present invention or which has been acquired in the process of contriving the present invention, and can not necessarily be regarded as well-known technology which had been known to the public prior to the filing of the present invention.

DISCLOSURE

Technical Problem

The present invention is intended to overcome the technical limitations of the prior art, and an object of the present invention is to provide a method and device for estimating the road surface friction coefficient of a tire, which are capable of estimating a friction coefficient by using longitudinal propulsive force required in response to an increase in driving load even in a high speed normal driving state, which is a state in which braking pressure or steering is minimized.

More specifically, an object of the present invention is to provide a method and device for estimating the road surface friction coefficient of a tire, which are capable of estimating current friction coefficient information by using existing map data based on information about the slip ratio, normal force, and longitudinal force of each wheel in a high speed normal driving state, thereby improving reliability.

Technical Solution

As a technical solution for accomplishing the above objects, according to one aspect of the present invention, there may be provided a method for estimating the road surface friction coefficient of a tire, the method estimating the road surface friction coefficient of a tire mounted on a wheel of a vehicle in a state in which the vehicle is normally running at high speed, the method including: acquiring the state information of a vehicle including at least one of engine state information, transmission state information, and chassis state information from sensors mounted on the vehicle and specifications set for the vehicle; estimating a longitudinal slip ratio, normal force, and longitudinal force for a tire mounted on each wheel of the vehicle by using the acquired state information of the vehicle; and estimating a road surface friction coefficient for the tire by using the estimated longitudinal slip ratio, normal force, and longitudinal force.

In this case, estimating the friction coefficient may include accumulating an estimated longitudinal force value, an estimated normal force value, and an estimated longitudinal slip ratio value in the form of map data and estimating a current friction coefficient based on a cumulative data.

More specifically, estimating the friction coefficient may include: a map data accumulation step of deriving normalized longitudinal force of each wheel by dividing the estimated longitudinal force value by the estimated normal force value and accumulating the normalized longitudinal force, together with the estimated slip ratio value and the friction coefficient estimated value, as the map data; a map data comparison step of comparing the slip ratio currently estimated at the slip ratio estimation step with the cumulative slip ratio value accumulated in the map data; and a step of estimating the current friction coefficient based on the cumulative value of the normalized longitudinal force corresponding to the cumulative slip ratio value compared at the map data comparison step.

According to another aspect of the present invention, there may be provided a device for estimating the road surface friction coefficient of a tire, the device estimating the road surface friction coefficient of a tire in a state in which a vehicle is normally running at high speed, the device including: an information provider configured to receive and provide the engine state information, transmission state information, or chassis state information of a vehicle from sensors mounted on the vehicle and specifications set for the vehicle; a vehicle speed estimator configured to estimate the longitudinal velocity and lateral velocity of the vehicle based on the state information of the vehicle provided by the information provider; a vehicle mass & grade estimator configured to estimate the mass of the vehicle and the grade of a road based on the state information of the vehicle provided by the information provider; a slip ratio estimator configured to estimate the slip ratio of each wheel based on the state information of the vehicle provided by the information provider and the estimated longitudinal velocity value and estimated lateral velocity value of the vehicle estimated by the vehicle speed estimator; a normal tire force estimator configured to estimate normal force applied to each wheel based on the state information of the vehicle provided by the information provider and the estimated mass value of the vehicle and estimated grade value of the road estimated by the vehicle mass & grade estimator; a longitudinal tire force estimator configured to estimate the longitudinal force of each wheel based on the rotational angular velocity of each wheel, braking pressure, and propulsive torque based on engine torque provided by the information provider; and a friction coefficient estimator configured to estimate the road surface friction coefficient of a tire based on the estimated longitudinal force value of each wheel estimated by the longitudinal tire force estimator, the estimated normal force value of each wheel estimated by the normal tire force estimator, and the estimated slip ratio value of each wheel estimated by the slip ratio estimator.

Advantageous Effects

According to the above-described technical solution of the present invention, the method and device for estimating the road surface friction coefficient of a tire according to the present invention estimate a friction coefficient by using longitudinal propulsive force generated in a high speed driving environment, and, thus, can estimate the road surface friction coefficient of a tire even in a state in additional pressure, such as braking or steering, is minimized or is not present. When the present invention is applied to a driver assistance system, an autonomous driving system, or the like, more rapid response can be made than conventional technology, thereby securing driving stability.

In particular, according to the present invention, map data is constructed based on information about the slip ratios, normal forces, and longitudinal forces of each wheel estimated from state information based on the sensor values of a vehicle or specifications, and current friction coefficient information is estimated using the map data, so that the reliability and accuracy of the estimation can be expected.

The effects which may be acquired by the present invention are not limited to the above-described effects, and other effects which have not been described will be clearly understood by those having ordinary knowledge in the art, to which the present invention pertains, from the following description.

MODE FOR INVENTION

Figure 1:
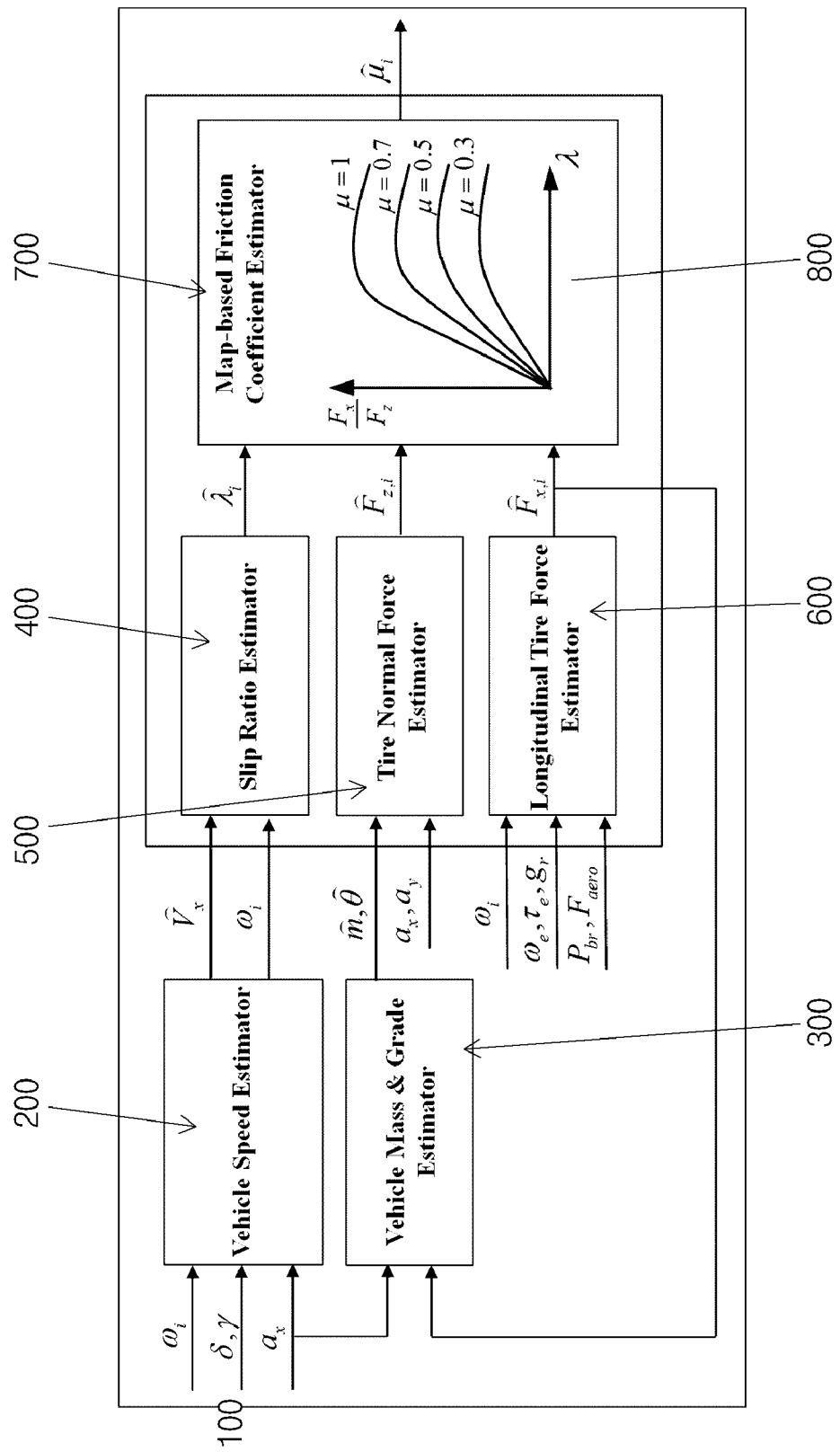
FIG. 1 is a block diagram showing the configuration of a device for estimating the road surface friction coefficient of a tire according to the present invention.

Embodiments of the present invention will be described below with reference to the accompanying drawings in order to enable those having ordinary knowledge in the art to which the present invention pertains to easily practice the present invention. However, the present invention may be implemented in different forms, and is not limited to the embodiments described herein. Furthermore, in order to clearly illustrate the present invention in the drawings, portions unrelated to the following description will be omitted. Throughout the specification, similar reference symbols will be assigned to highly related portions.

Throughout the specification and the claims, when one component is described as being "connected" to another component, the one component may be "directly connected" to the other component or "electrically connected" to the other component through a third component. Furthermore, when any portion is described as including any component, this does not mean that the portion does not exclude another component but means that the portion may further include another component, unless explicitly described to the contrary.

The present invention will be described in detail below with reference to the accompanying drawings.

A method for estimating the road surface friction coefficient of a tire according to an embodiment of the present invention uses the longitudinal propulsive force which is required in a state in which a vehicle is normally running in high speed. More specifically, the method for estimating the road surface friction coefficient of a tire is technology which accumulates information about the slip ratio, normal force, and longitudinal force of each wheel as map data during the high speed driving of a vehicle and estimates the current road surface friction coefficient of a tire.

For this purpose, in the present invention, the method for estimating a friction coefficient may be performed by a device for estimating a friction coefficient, which includes an information provider 100, a vehicle speed estimator 200, a vehicle mass & grade estimator 300, a slip ratio estimator 400, a normal tire force estimator 500, a longitudinal tire force estimator 600, a friction coefficient estimator 700, and map data 800, as shown in FIG. 1.

Figure 4:
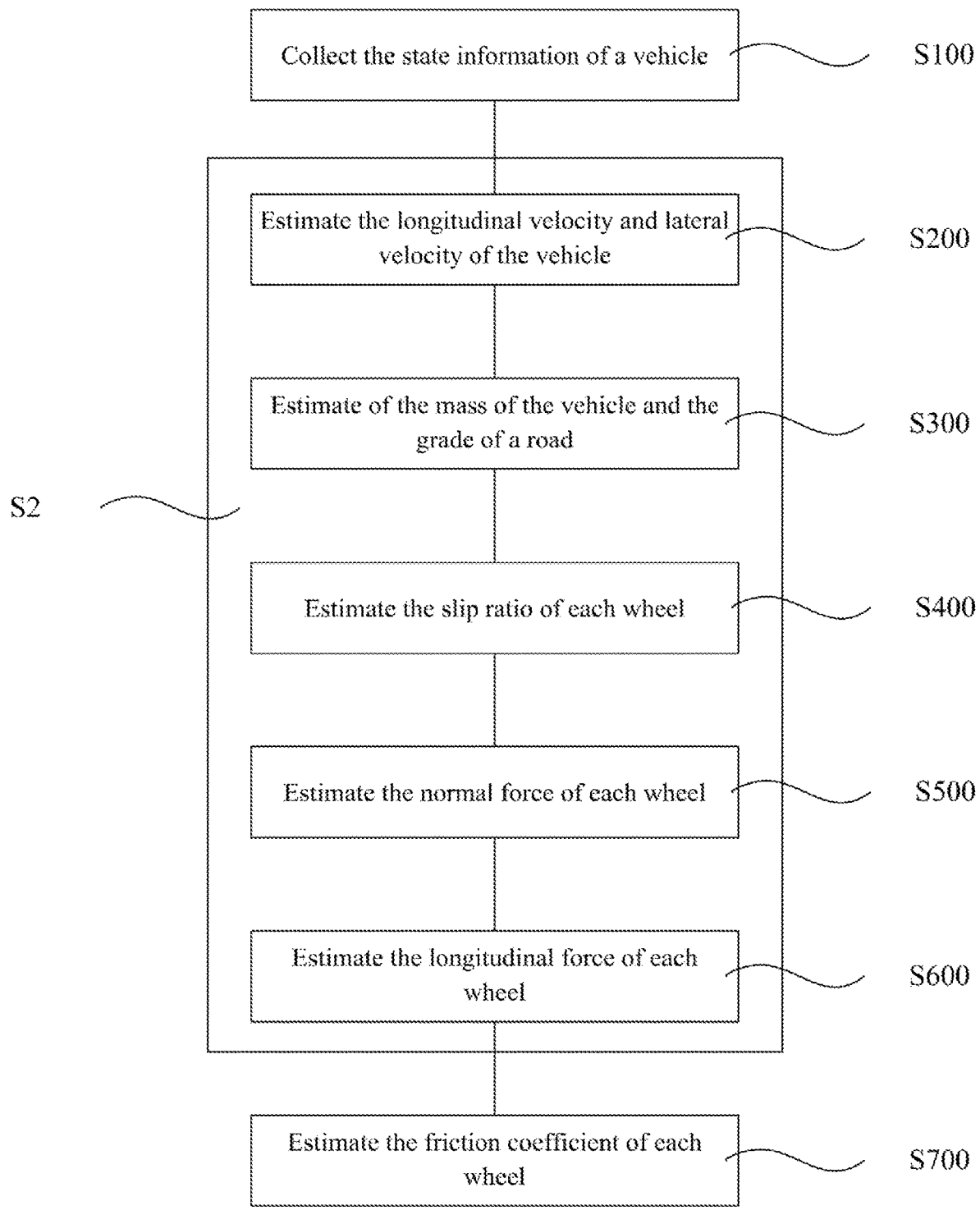
FIG. 4 is a block diagram showing a method for estimating the road surface friction coefficient of a tire according to the present invention.

Furthermore, the specific method for estimating a friction coefficient may include an information collection step S100, a longitudinal slip ratio, normal force, and longitudinal force estimation step S2, and a friction coefficient estimation step S700, as shown in FIG. 4. The step S2 may include a speed estimation step S200, a vehicle mass & grade estimation step S300, a slip ratio estimation step S400, a normal force estimation step S500, and a longitudinal force estimation step S600.

The information provider 100 is a component which provides the state information of a vehicle. The information provider 100 provides the engine state information, transmission state information and chassis information of a vehicle, for example, in the state of being connected to the ECU of the vehicle or being mounted on the vehicle. More specifically, the information provider 100 provides the state information of the vehicle via various types of sensors previously installed in the vehicle and specifications previously set in the vehicle at step S100.

For example, the information provider 100 provides the state information of a vehicle, such as the rotational speed of each wheel, the yaw rate of the vehicle, the longitudinal and lateral acceleration information of the vehicle, the steering angle of the vehicle, braking pressure, engine torque, the radius of each wheel, the rotational angular velocity of an engine, etc.

The vehicle speed estimator 200 is a component which estimates and provides the longitudinal velocity and lateral velocity of the vehicle based on the state information of the vehicle provided by the above-described information provider 100.

In this case, although a vehicle speed value provided by the vehicle itself may be used as the speed information of the vehicle, the present invention requires an accurate vehicle speed value in order to compute the slip ratio of each wheel of the vehicle based on a vehicle speed value. Accordingly, the value is directly estimated via the vehicle speed estimator 200.

Figure 11:
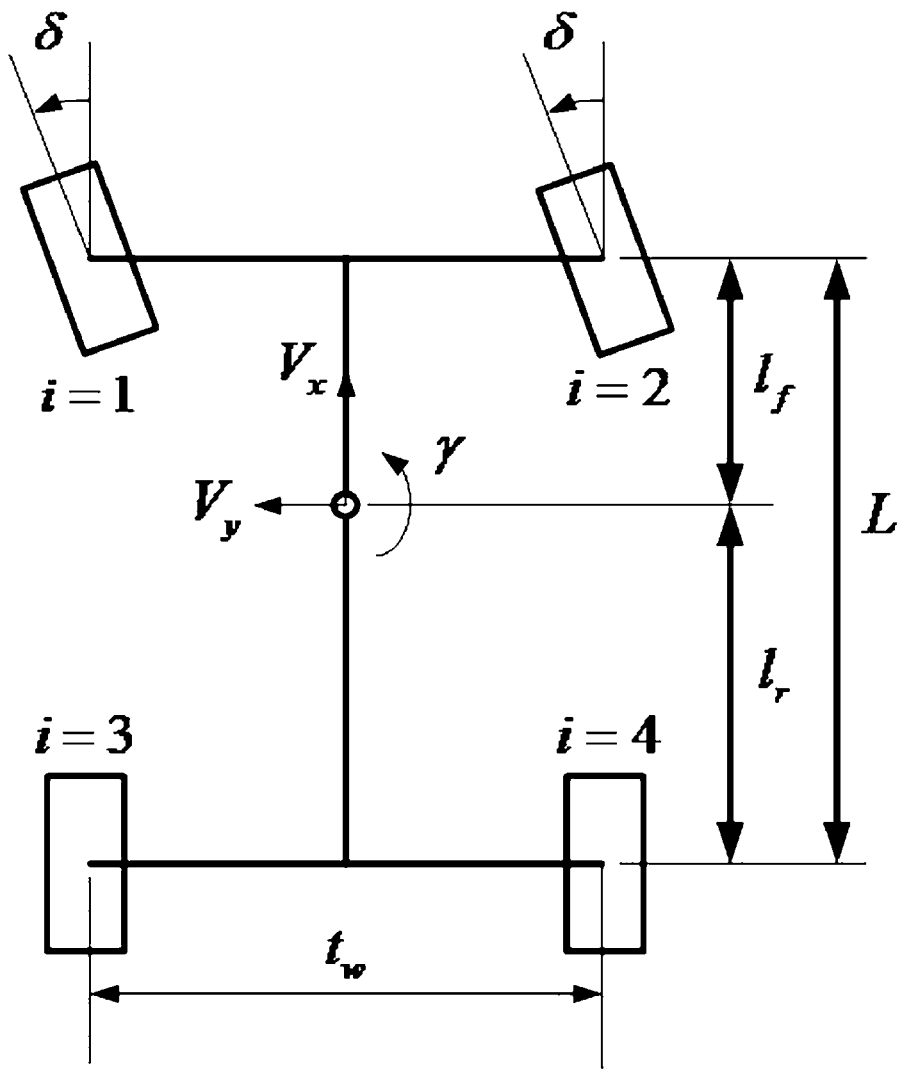
FIG. 11 is a diagram showing the structure of each wheel.

In this case, referring to FIG. 11, the vehicle speed estimator 200 may estimate the longitudinal velocity and lateral velocity of the vehicle based on the distances $l_f$ and $l_r$ from the center of mass of the vehicle to front and rear wheels, the width $t_w$ of the vehicle, the radius $r_i$ of each wheel, the rotational angular velocity $\omega_i$ of each wheel, the steering angle $\delta$ of the vehicle, yaw rate $\gamma$, and the longitudinal and lateral acceleration information $\alpha_x$ and $\alpha_y$ of the vehicle, which are provided by the information provider 100, at step S200

Figure 10:
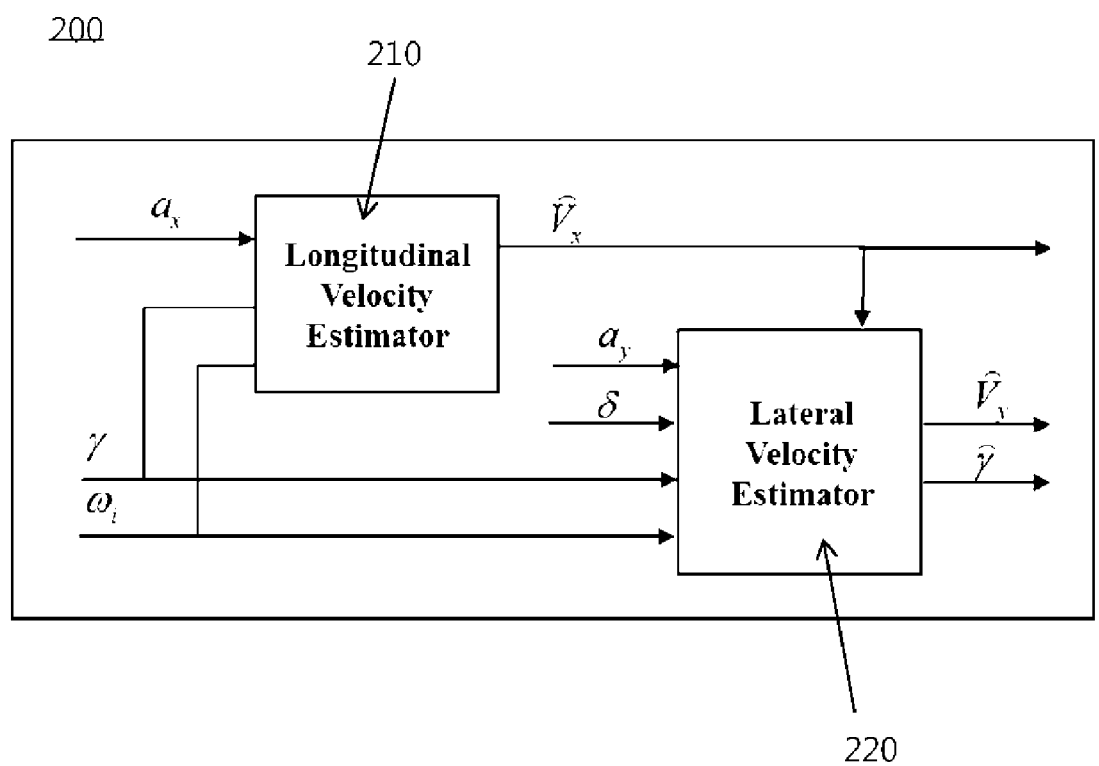
FIG. 10 is a block diagram showing the configuration of the vehicle speed estimator shown in FIG. 1.

More specifically, the vehicle speed estimator 200 may include a longitudinal velocity estimator 210 and a lateral velocity estimator 220, as shown in FIG. 10, and estimates the longitudinal velocity and lateral velocity of the vehicle based on the state information provided by the above-described information provider 100.

In this case, as to the parameters shown in FIG. 10, $\alpha_x$ is the longitudinal acceleration of the vehicle, $\gamma$ is the yaw rate of the vehicle, $\omega_i$ is the rotational angular velocity of the i-th wheel, $\hat{V}_x$ is the estimated longitudinal velocity of the vehicle, $\alpha_y$ is the lateral acceleration of the vehicle, $\delta$ is the steering angle of a driver, $\hat{V}_y$ is the estimated lateral velocity of the vehicle, and $\hat{\gamma}$ is the estimated yaw rate of the vehicle.

In this case, the longitudinal velocity $V_x$ of the vehicle may be expressed by Equation 1 below:

$$\dot{V}_x = \alpha_x \quad (1)$$

Furthermore, when the rotational angular velocity of each wheel and the yaw rate of the vehicle are used, the speed of the vehicle may be expressed by Equation 2 below:

$$V_{x,i} = r_{i,eff} \omega_i \cos\delta_i + \frac{t_w \gamma}{2} \cdot D.I. \quad (2)$$

$$\text{where} \begin{cases} \delta_i = \delta \text{ for } i = 1, 2 \\ \delta_i = 0 \text{ for } i = 3, 4 \\ D.I. = +1 \text{ for } i = 1, 3 \\ D.I. = -1 \text{ for } i = 2, 4 \end{cases}$$

where $V_{x,i}$ is the longitudinal velocity of the vehicle calculated using the measured rotational angular velocity value of the i-th wheel, $r_{i,eff}$ is the effective radius of the i-th wheel, $\omega_i$ is the rotational angular velocity of the i-th wheel, $\delta_i$ is the steering angle of the i-th wheel, $\delta$ is the steering angle of the driver, $t_w$ is the width of the vehicle, $\gamma$ is the yaw rate of the vehicle, and D.I. is a directional index.

Using the above-described Equation 2, the longitudinal velocity estimator 210 may be designed based on Equation 3 below:

$$\dot{\hat{V}}_x = \alpha_x + \Sigma_{i=1}^{4} K_i(\alpha_x, \omega_i, \hat{V}_x) \cdot (V_{x,i} - \hat{V}_x) \quad (3)$$

where $\hat{V}_x$ is the estimated longitudinal velocity of the vehicle, $\alpha_x$ is the longitudinal acceleration of the vehicle, $\omega_i$ is the rotational angular velocity of the i-th wheel, $K_i(\alpha_x, \omega_i, \hat{V}_x)$ is an estimation factor which is determined based on the acceleration of the vehicle, the rotational angular velocity of each wheel, and the estimated longitudinal velocity of the vehicle (which is set in advance such that when the slip ratio of each wheel is small, the value thereof increases), and $V_{x,i}$ is the longitudinal velocity of the vehicle calculated using the measured rotational angular velocity value of the i-th wheel.

Furthermore, the lateral velocity of the vehicle may be expressed by Equation 4 below:

$$\dot{V}_y = -V_x \gamma + a_y \quad (4)$$

$$\dot{\gamma} = \frac{1}{J} \sum_{i=1}^{4} (-F_{x,i} \cos\delta_i \cdot D.I. + F_{y,i} \sin\delta_i)$$

$$\text{where} \begin{cases} \delta_i = \delta \text{ for } i = 1, 2 \\ \delta_i = 0 \text{ for } i = 3, 4 \\ D.I. = +1 \text{ for } i = 1, 3 \\ D.I. = -1 \text{ for } i = 2, 4 \end{cases}$$

where $V_y$ is the lateral velocity of the vehicle, $V_x$ is the longitudinal velocity of the vehicle, $\gamma$ is the yaw rate of the vehicle, $\alpha_y$ is the lateral acceleration of the vehicle, J is the yaw (rotational) moment of inertia of the vehicle, $F_{x,i}$ is the longitudinal force of the i-th wheel, $F_{y,i}$ is the lateral tire force of the i-th wheel, $\delta_i$ is the steering angle of the i-th wheel, and $\delta$ is the steering angle of the driver.

Using the above-described Equation 4, the lateral velocity estimator 220 may be designed based on Equation 5 below:

$$\dot{\hat{V}}_y = -V_x \gamma + a_y - K_{V_y} \left\{ ma_y - \sum_{i=1}^{4} (\hat{F}_{x,i} \sin\delta_i + \hat{F}_{y,i} \cos\delta_i) \right\} \quad (5)$$

$$\dot{\hat{\gamma}} = \frac{1}{J} \sum_{i=1}^{4} \left( -\hat{F}_{x,i} \cos\delta_i \cdot D.I. + \hat{F}_{y,i} \sin\delta_i \right) + K_\gamma (\gamma - \hat{\gamma})$$

-continued $$\text{where} \begin{cases} \delta_i = \delta \text{ for } i = 1, 2 \\ \delta_i = 0 \text{ for } i = 3, 4 \\ D.I. = +1 \text{ for } i = 1, 3 \\ D.I. = -1 \text{ for } i = 2, 4 \end{cases}$$

where $V_y$ is the lateral velocity of the vehicle, $\hat{V}_y$ is the estimated lateral velocity of the vehicle, $V_x$ is the longitudinal velocity of the vehicle, $\gamma$ is the yaw rate of the vehicle, $\hat{\gamma}$ is the estimated yaw rate of the vehicle, $\alpha_y$ is the lateral acceleration of the vehicle, m is the mass of the vehicle, J is the yaw (rotational) moment of inertia of the vehicle, $\hat{F}_{x,i}$ is the estimated longitudinal force of the i-th wheel, $\hat{F}_{y,i}$ is the estimated lateral tire force of the i-th wheel, $F_{x,i}$ is the longitudinal force of the i-th wheel, $F_{y,i}$ is the lateral tire force of the i-th wheel, $\delta_i$ is the steering angle of the i-th wheel, D.I. is a directional index, and $\delta$ is the steering angle of the driver.

Meanwhile, in the present invention, it may be assumed that the slip of each wheel is small because road surface friction is estimated in the normal driving state of the vehicle. Accordingly, the vehicle speed estimator 200 may assume the longitudinal force and lateral tire force of each wheel to be proportional to the longitudinal slip ratio and the lateral slip angle based on a linear model, which may be given as Equation 6 below:

$$\hat{F}_{x,i} = C_{x,i} \hat{\lambda}_i$$

$$\hat{F}_{y,i} = C_{y,i} \hat{\alpha}_i \quad (6)$$

where $\hat{F}_{x,i}$ is the estimated longitudinal force of the i-th wheel, $C_{x,i}$ is the longitudinal tire stiffness ratio of the i-th tire (a grade between the longitudinal force and the longitudinal slip ratio), $\hat{\lambda}_i$ is the longitudinal slip ratio of the i-th tire, $\hat{F}_{y,i}$ is the estimated lateral tire force of the i-th wheel, $C_{y,i}$ is the lateral tire stiffness ratio of the i-th tire (a grade between the lateral tire force and the lateral slip angle), and $\hat{\alpha}_i$ is the lateral slip angle of the i-th tire.

Furthermore, the longitudinal slip ratio of the i-th wheel estimated using the above equation is given below:

$$\hat{\lambda}_i = \frac{\omega_i r_{i,eff} - V_i \cos(\hat{\alpha}_i)}{\max(\omega_i r_{i,eff}, V_i \cos(\hat{\alpha}_i))} \quad (7)$$

where $\hat{\lambda}_i$ is the estimated the longitudinal slip ratio of the i-th wheel, $\omega_i$ is the rotational angular velocity of the i-th wheel, $r_{i,eff}$ is the effective radius of the i-th wheel (the distance between the central axis of each wheel and a road surface in the state of being deformed due to longitudinal force applied to each wheel), $V_i$ is the velocity of the center of the i-th wheel, and $\alpha_i$ is the lateral slip angle of the i-th wheel.

Furthermore, the lateral slip angle of the i-th wheel estimated using the above equation is given by Equation 8 below:

$$\hat{\alpha}_i = \delta_i - \tan^{-1} \frac{\hat{V}_{y,i}}{\hat{V}_{x,i}} \quad (8)$$

$$\text{where} \begin{cases} \delta_i = \delta \text{ for } i = 1, 2 \\ \delta_i = 0 \text{ for } i = 3, 4 \end{cases}$$

where $\hat{\alpha}_i$ is the estimated lateral slip angle of the i-th wheel, $\delta_i$ is the steering angle of the i-th wheel, $\hat{V}_{y,i}$ is the estimated speed at which the center of the i-th wheel is moved in the lateral direction of the vehicle, and $\hat{V}_{x,i}$ is the estimated speed at which the center of the i-th wheel is moved in the longitudinal direction of the vehicle.

The estimated values calculated immediately previously are used as the estimated values used for the estimation of speed as described above, the values estimated by the vehicle speed estimator 200 except for the longitudinal velocity and the lateral velocity are values used only in the vehicle speed estimator 200, and the values newly estimated by components which will be described later will be used as other values.

In particular, the estimated values previously calculated by the longitudinal tire force estimator 600 and the slip ratio estimator 400, which will be described later, may be used in place of the tire force, the longitudinal slip ratio, and the lateral slip ratio.

The vehicle mass & grade estimator 300 is a component which estimates the mass of the vehicle and the grade of the road based on the state information of the vehicle provided by the information provider.

In general, in vehicle systems such as a driver assistance system, an autonomous driving system, etc, the mass of the vehicle is assumed to be constant, and the grade of a road is also assumed to be flat. In contrast, in commercial vehicles where the mass of a vehicle is important and in systems where information about the grade of a road is important, it is important to estimate these values in real time. Accordingly, for this purpose, various types of research are being conducted. The longitudinal force and the normal force which are used to estimate the road surface friction coefficient of a tire in the present invention are also values which are influenced by the mass of the vehicle and the grade of the road. Accordingly, the mass of the vehicle and the grade of the road are estimated via the vehicle mass & grade estimator 300 at step S300.

Figure 6:
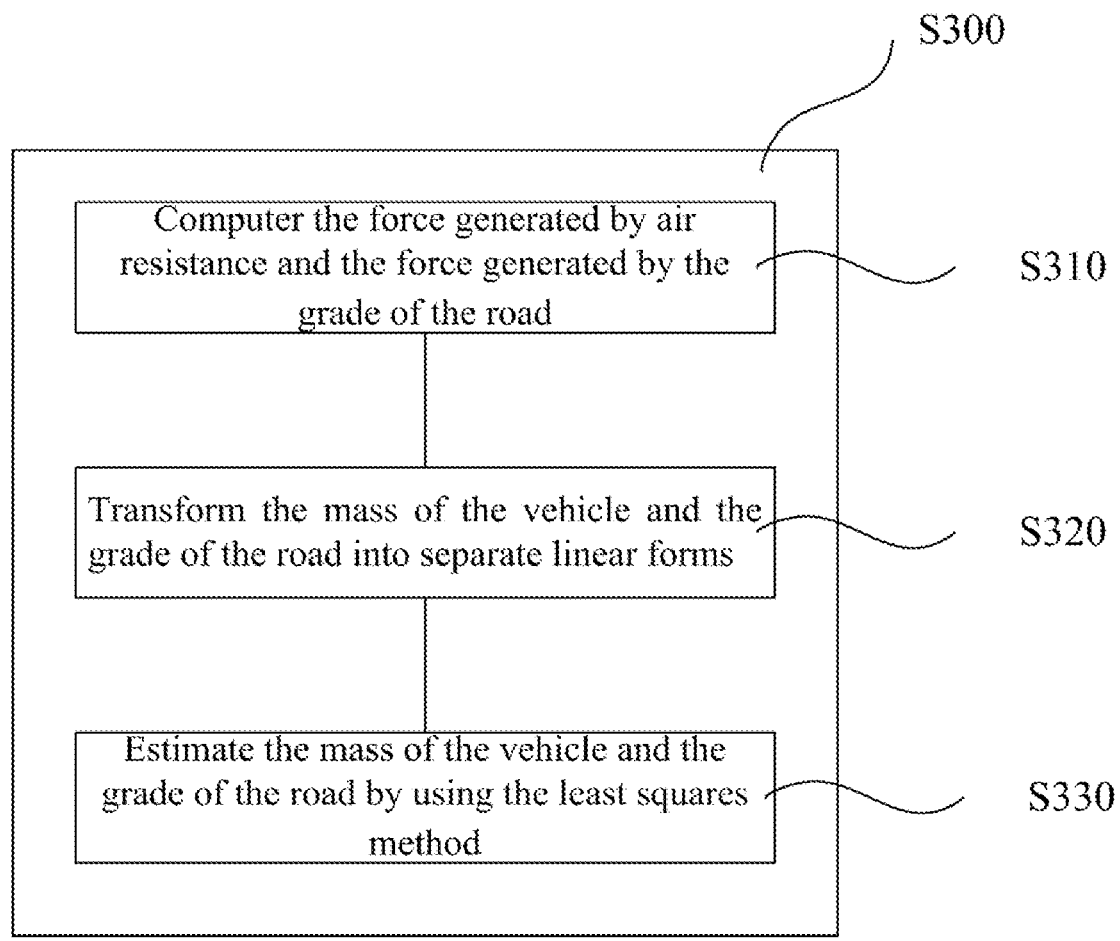
FIG. 6 is a block diagram showing the vehicle mass & grade estimation step shown in FIG. 4.

More specifically, when the mass of the vehicle and the grade of the road are estimated, a process including a resistance computation step S310, a linear transformation step S320, and a vehicle mass & grade computation step S330 may be performed, as shown in FIG. 6.

The resistance computation step S310 is a step at which the force generated due to air resistance attributable to the movement of the vehicle and the longitudinal force generated in the vehicle due to the grade of the road are obtained.

In this case, when it is assumed that in a general driving state, the slip ratio of the wheel is small, the longitudinal dynamic equation of the vehicle is given as Equation 9 below:

$$m\dot{V}_x = \frac{\tau_e - J_e \dot{\omega}}{r_g} - F_{fb} - F_{aero} - F_{grade} \quad (9)$$

where m is the mass of the vehicle, $V_x$ is the longitudinal velocity of the vehicle, $\tau_e$ is engine torque (in a flywheel), $J_e$ is the inertial mass of a power train, $\omega$ is the rotational angular velocity of the engine, $r_g$ is the radius of the wheel divided by gear ratio $$\left( r_g = \frac{r_w}{g_r}, \right.$$

$r_w$ is the radius of the wheel and $g_r$ is the gear ratio between an engine output end of the vehicle wheel (the ratio between the rotational angular velocity of the engine and the rotational angular velocity of the vehicle wheel)), $F_{fb}$ is the longitudinal braking force of the vehicle generated due to braking pressure, $F_{aero}$ is the resistance generated due to air resistance attributable to the movement of the vehicle, and $F_{grade}$ is the longitudinal force generated in the vehicle due to the grade of the road.

In this case, at the resistance computation step S310, the resistance $F_{aero}$ generated due to air resistance attributable to the movement of the vehicle and the longitudinal force $F_{grade}$ generated in the vehicle due to the grade of the road are obtained using Equation 10 below:

$$F_{aero} = \tfrac{1}{2} C_d \rho A V_x^2$$

$$F_{aero} = mg(\mu \cos\theta + \sin\theta) \quad (10)$$

where $C_d$ is a resistance coefficient for resistance generated due to fluid, $\rho$ is the density of air, A is an actual effective cross-sectional area which is subjected to resistance due to the relative movement between the vehicle and air, $V_x$ is the longitudinal velocity of the vehicle, m is the mass of the vehicle, g is gravitational acceleration, $\mu$ is the tire-road surface friction coefficient, and $\theta$ is the grade of the road.

The linear transformation step S320 is the step of transforming the mass of the vehicle and the grade of the road, included in the above-described Equation 10, into linear forms. More specifically, parts regarding the mass of the vehicle and the grade of the road may be separated and transformation into Equation 12 and a linear form may be performed through substitution into Equation 11 below:

$$\dot{V}_x = \left( \frac{\tau_e - J_e \dot{\omega}}{r_g} - F_{fb} - F_{aero} \right) \frac{1}{m} - \frac{g}{\cos(\theta_\mu)} \sin(\theta + \theta_\mu), \quad (11)$$

where $\tan(\theta_\mu) = \mu$ $$y = \dot{V}_x = \phi^T \cdot s = [\phi_1 \; \phi_2] \begin{bmatrix} s_1 \\ s_2 \end{bmatrix}, \quad (12)$$

where $\phi = \begin{bmatrix} \phi_1 \\ \phi_2 \end{bmatrix} = \begin{bmatrix} \frac{\tau_e - J_e \dot{\omega}}{r_g} - F_{fb} - F_{aero} - \frac{g}{\cos(\theta_\mu)} \end{bmatrix}$, $$s = \begin{bmatrix} \frac{1}{m} \\ \sin(\theta + \theta_\mu) \end{bmatrix}$$

where $V_x$ is the longitudinal velocity of the vehicle, $\tau_e$ is engine torque (in a flywheel), $J_e$ is the inertial mass of a power train, $\omega$ is the rotational angular velocity of the engine, $r_g$ is the radius of the wheel divided by gear ratio $$\left( r_g = \frac{r_w}{g_r}, \right.$$

where $r_w$ is the radius of the wheel and $g_r$ is the gear ratio between an engine output end of the vehicle wheel (the ratio between the rotational angular velocity of the engine and the rotational angular velocity of the vehicle wheel)), $F_{fb}$ is the longitudinal braking force of the vehicle generated due to braking pressure, $F_{aero}$ is the resistance generated due to air resistance attributable to the movement of the vehicle, g is gravitational acceleration, $\mu$ is a tire-road surface friction coefficient, $\theta$ is the grade of the road, $\theta_\mu$ is a grade value obtained by representing the friction coefficient in the form of the grade of the road in order to simply the equation, and m is the mass of the vehicle.

The vehicle mass & grade computation step S330 is the step of estimating the mass of the vehicle and the grade of the road based on a linear type equation obtained through transformation at the linear transformation step, at which the mass of the vehicle and the grade of the road that maximize the function of Equation 13 below by using the recursive least squares method:

$$V(\hat{s}, n) = \tfrac{1}{2} \Sigma_{i=1}^n (y(i) - \phi^T(i)\hat{s})^2 \quad (13)$$

where $V(\hat{s}, n)$ is the target function of the recursive least squares method, $\hat{s}$ is an estimated s value (which is defined in Equation 12), n is the number of pieces of data used in the recursive least squares method, y(i) is i-th data used in the recursive least squares method among calculated longitudinal accelerations, and $\phi(i)$ is i-th data used in the recursive least squares method among $\phi$ (which is defined in Equation 12).

The slip ratio estimator 400 is a component which estimates the slip ratio of each wheel based on the state information of the vehicle provided by the information provider 100 the estimated longitudinal velocity value and estimated lateral velocity value of the vehicle estimated by the above-described vehicle speed estimator.

Figure 7:
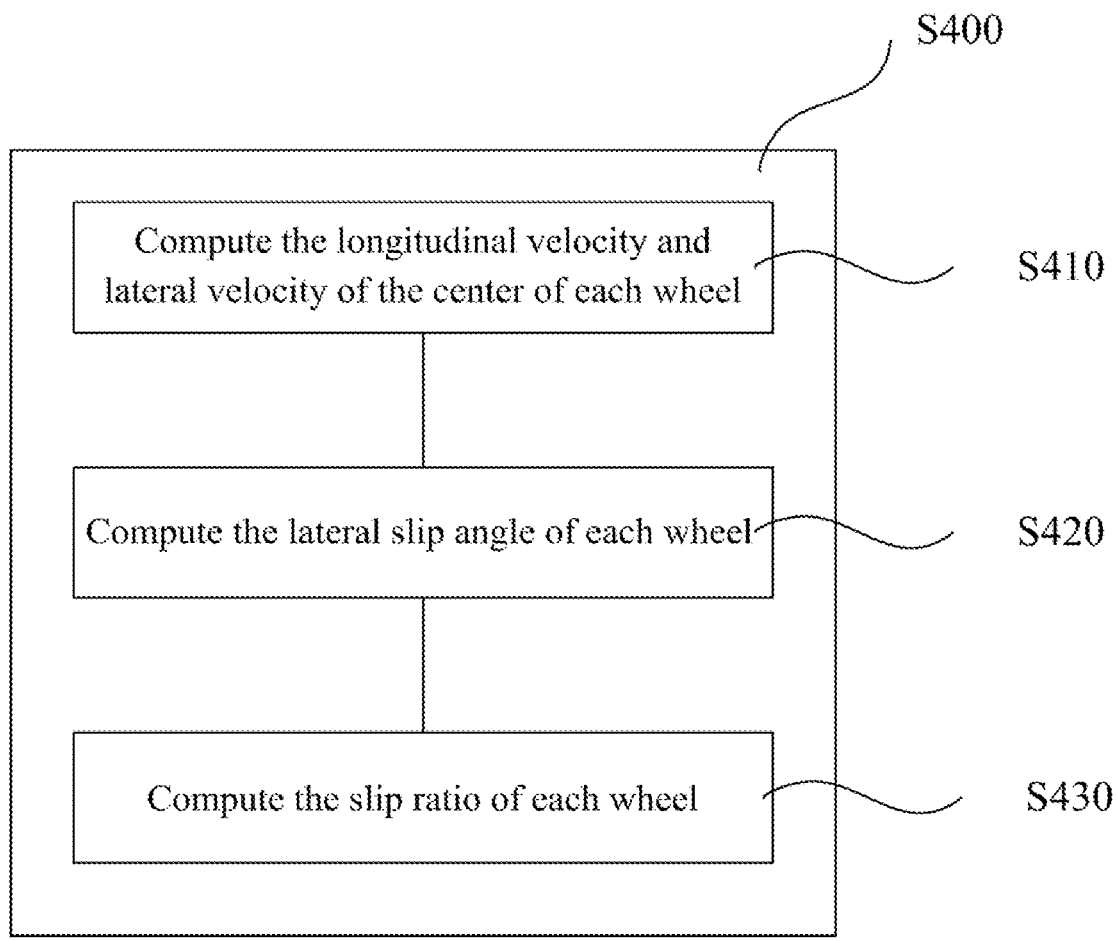
FIG. 7 is a block diagram showing the slip ratio estimation step shown in FIG. 4.

More specifically, the slip ratio estimation step S400 may be performed to include a wheel velocity computation step S410, a slip angle computation step S420, and a slip ratio computation step S430, as shown in FIG. 7.

In this case, the slip ratio of each wheel is influenced by the current traveling speed of the vehicle, the rotational angular velocity of each wheel, the steering angle, etc.

The wheel velocity computation step S410 is the step of obtaining the longitudinal velocity and lateral velocity of the center of each wheel based on the state information of a vehicle provided by the information provider 100 and the longitudinal velocity and lateral velocity estimated at the speed estimation step S200, at which the longitudinal velocity and lateral velocity of the center of each wheel are obtained using Equation 14 below:

$$V_{x,*L} = V_x - \frac{t_w}{2}\gamma, \; V_{x,*R} = V_x + \frac{t_w}{2}\gamma \quad (14)$$

$$V_{y,F*} = V_y + l_f \gamma, \; V_{x,R*} = V_y - l_r \gamma$$

where $V_{x,i}$ and $V_{y,i}$ are the longitudinal velocity and lateral velocity of the center of each wheel, $V_x$ and $V_y$ are the speeds of the vehicle, $\gamma$ is the yaw rate of the vehicle, $l_f$ and $l_r$ are the distances from the center of mass of the vehicle to the front wheel and the rear wheel, and $t_w$ is the width of the vehicle.

The slip angle computation step S420 is the step of obtaining the lateral slip angle of each wheel, at which the slip angle of each front wheel and the slip ratio of each rear wheel are obtained using Equation 15 below:

$$\alpha_{F*} = \delta - \tan^{-1} \frac{V_{y,F*}}{V_{x,F*}} \quad (15)$$

$$\alpha_{R*} = -\tan^{-1} \frac{V_{y,R*}}{V_{x,R*}}$$

where $\alpha_{F*}$ is the lateral slip angle of each front wheel of the vehicle (the angle between the direction which the wheel faces and the direction in which the actual wheel moves), $\alpha_{R*}$ is the lateral slip angle of each rear wheel of the vehicle (the angle between the direction which the wheel faces and the direction in which the actual wheel moves), $\delta$ is the steering angle of the wheel generated by the steering of the driver, $V_{x,*L}$ is the speed at which the center of left wheel vehicle moves in the longitudinal direction of the vehicle, $V_{x,*R}$ is the speed at which the center of the right wheel of the vehicle moves in the longitudinal direction of the vehicle, $V_{y,F*}$ is the speed at which the center of each front wheel of the vehicle moves in the lateral direction of the vehicle, and $V_{x,r*}$ is the speed at which the center of each rear wheel of the vehicle moves in the lateral direction of the vehicle.

Figure 2:
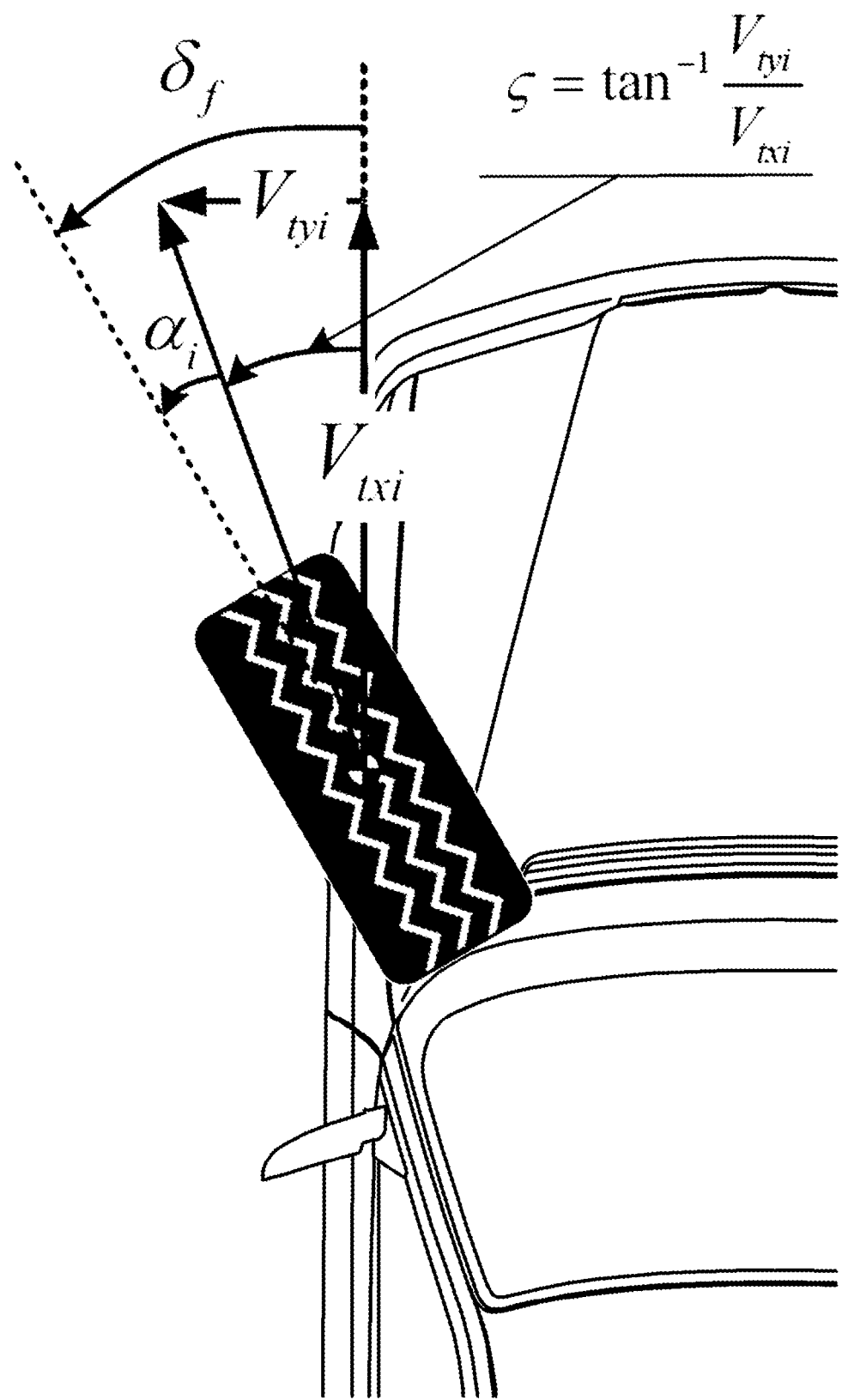
FIG. 2 is a diagram showing the configuration of a wheel of a vehicle.

The slip ratio computation step S430 is the step of estimating the slip ratio of each wheel by computing it, at which the slip ratio of each wheel is computed using Equation 16 below for the velocity $V_i = \sqrt{V_{x,i}^2 + V_{y,i}^2}$ of each wheel and the effective radius $r_{eff}$ of each wheel:

$$\lambda_i = \frac{\omega_i r_{i,eff} - V_i \cos(\alpha_i)}{\max(\omega_i r_{i,eff}, V_i \cos(\alpha_i))} \quad (16)$$

where, referring to FIG. 2, $\lambda_i$ is the longitudinal slip ratio of the i-th wheel, $\omega_i$ is the rotational angular velocity of the i-th wheel, $r_{i,eff}$ is the effective radius of the i-th wheel (the distance between the central axis of each wheel and a road surface in the state of being deformed due to longitudinal force applied to each wheel), $V_i$ is the velocity of the center of the i-th wheel, and $\alpha_i$ is the lateral slip angle of the i-th wheel.

The normal tire force estimator 500 is a component which estimates the normal force applied to each wheel, and estimates the normal force based on the state information of a vehicle and the estimated value of the mass of the vehicle and estimated value of the grade of the road estimated by the above-described vehicle mass & grade estimator 300.

Figure 8:
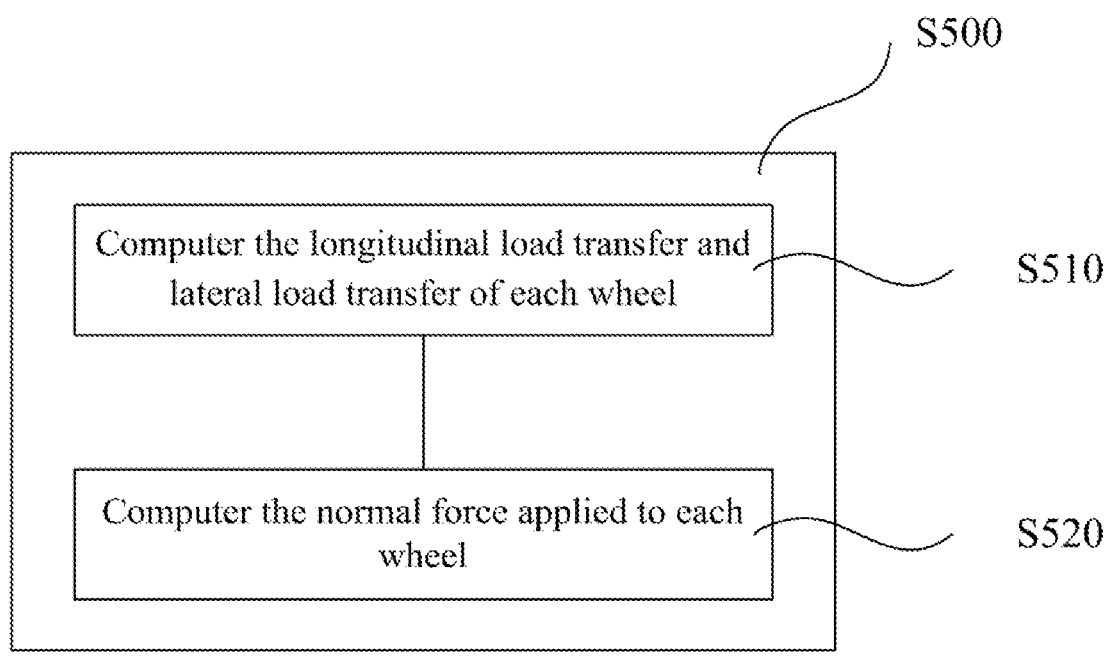
FIG. 8 is a block diagram showing the normal force estimation step shown in FIG. 4.

More specifically, the normal force estimation step S500 may be performed to include a load transfer computation step S510 and a normal force computation step S520, as shown in FIG. 8.

The load transfer computation step S510 is the step of obtaining the longitudinal load transfer and lateral load transfer of each wheel based on the above-described mass of the vehicle and grade of the road, at which the longitudinal load transfer and the lateral load transfer are computed using Equation 17 below:

$$W_{FA} = \frac{m_s}{2} \cdot \frac{h_s}{l_f + l_r} a_x \quad (17)$$

$$W_{LTF} = \frac{m_s h_r + m_u h_a + m_s e_s}{t_w} a_y \cdot \frac{l_r}{l_f + l_r}$$

$$W_{LTF} = \frac{m_s h_r + m_u h_a + m_s e_s}{t_w} a_y \cdot \frac{l_f}{l_f + l_r}$$

where $W_{FA}$ is the longitudinal load transfer, $W_{LTF}$ and $W_{LTR}$ are the lateral load transfer of the front and rear wheels, $\alpha_x$ and $\alpha_y$ are the current longitudinal acceleration and lateral acceleration of the vehicle, $m_s$ and $m_u$ are the upper mass and lower mass of a spring based on the suspension of the vehicle, $h_r$ is the distance from a floor to the center of the roll rotation of the vehicle, $h_u$ is the distance from the floor to the center of mass of the lower mass of the spring, $e_s$ is the distance from the center of the roll rotation to the center of mass of the upper mass of the spring, $l_f$ and $l_r$ are the distances from the center of mass of the vehicle to the front and rear wheels, and $t_w$ is the width of the vehicle.

The normal force computation step S520 is the step of computing the normal force applied to each wheel for the longitudinal load transfer and lateral load transfer computed at the above-described load transfer computation step S510, at which the normal force for the load transfer is computed using Equation 18 below:

$$\hat{F}_{z,FL} = \frac{1}{2} F_{SWF} - W_{LTF} - W_{FA} \quad (18)$$

$$\hat{F}_{z,FR} = \frac{1}{2} F_{SWF} + W_{LTF} - W_{FA}$$

$$\hat{F}_{z,RL} = \frac{1}{2} F_{SWR} - W_{LTR} + W_{FA}$$

$$\hat{F}_{z,RR} = \frac{1}{2} F_{SWR} + W_{LTR} + W_{FA}$$

$$\text{where} \begin{cases} F_{SWF} = \dfrac{l_r}{l_f + l_r} m_s g \\ F_{SWR} = \dfrac{l_f}{l_f + l_r} m_s g \end{cases}$$

where $\hat{F}_{z,FL}$, $\hat{F}_{z,FR}$, $\hat{F}_{z,RL}$, and $\hat{F}_{z,RR}$ are the estimated normal forces of respective wheels (FL-left front wheel, FR-right front wheel, RL-left rear wheel, and RR-right rear wheel), $F_{SWF}$ is the normal force applied to the front wheel of the vehicle in a normal state, $F_{SWR}$ is the normal force applied to the rear wheel of the vehicle in a normal state, $W_{FA}$ is the longitudinal load transfer, and $W_{LTF}$ and $W_{LTR}$ are the lateral load transfers of the front and rear wheels.

The longitudinal tire force estimator 600 is a component which estimates the longitudinal force of each wheel, and estimates the longitudinal force based on the rotational angular velocity of each wheel, the braking pressure, and propulsive torque attributable to the engine torque.

Figure 9:
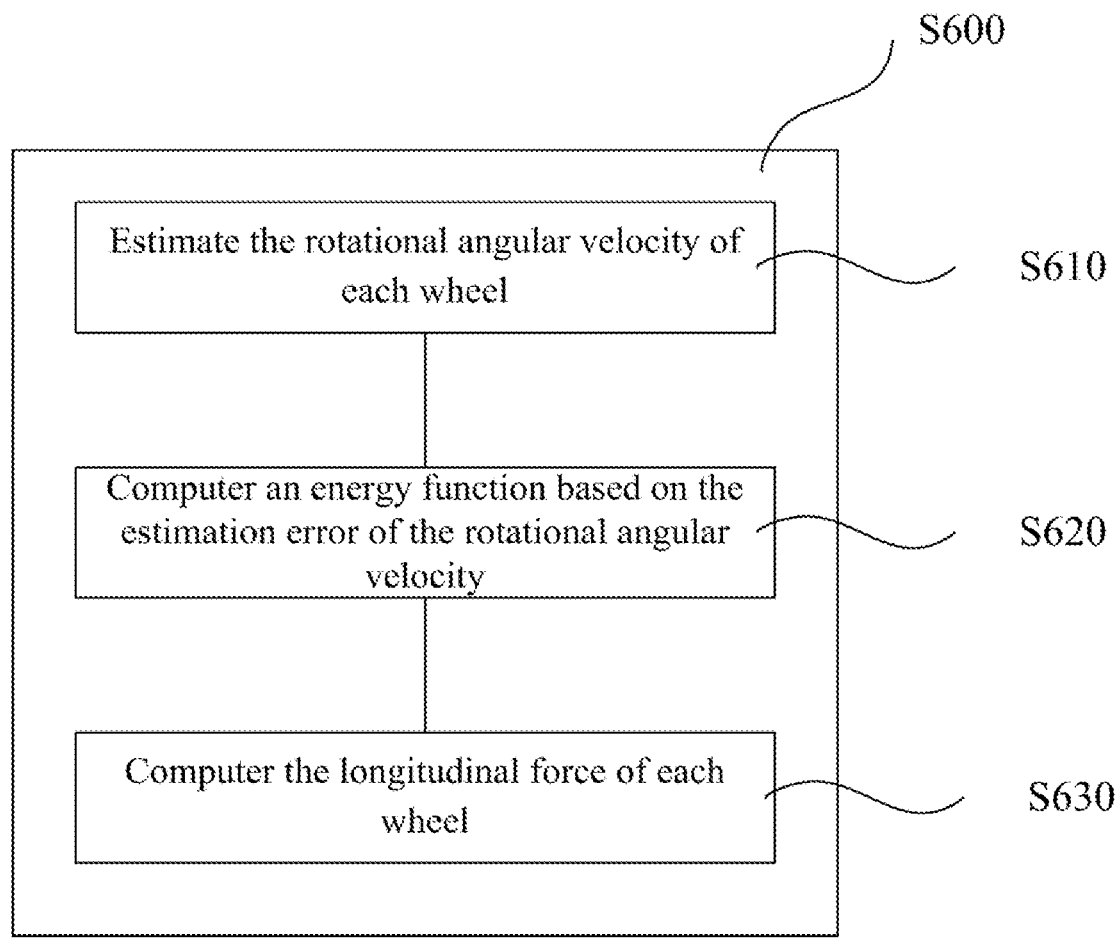
FIG. 9 is a block diagram showing the longitudinal force estimation step shown in FIG. 4.

More specifically, the longitudinal force estimation step S600 may be performed to include a rotational angular velocity estimation step S610, an energy function computation step S620, and a longitudinal force computation step S630, as shown in FIG. 9.

The rotational angular velocity estimation step S610 is the step of estimating the rotational angular velocity of each wheel based on the state information of a vehicle, at which the rotational angular velocity is obtained using Equation 19 below:

$$\hat{\omega} = \frac{1}{I_{\omega,i}} \left( r_{\omega,i} \hat{F}_{x,i} - T_{b,i} + T_s - r_{\omega,i} F_{rr} \right) \quad (19)$$

where $\hat{\omega}$ is the estimated rotational angular velocity of each wheel, $I_{\omega,i}$ is the rotational inertia of each tire, $r_{\omega,i}$ is the effective radius of each tire, $F_{x,j}$ is the longitudinal force of each tire, $T_{b,i}$ is the brake pressure of each wheel, $T_s$ is the propulsive torque applied to each wheel, and $F_{rr}$ is rolling resistance.

The energy function computation step S620 is the step of computing an energy function for the estimation of the longitudinal force, at which the energy function is computed by defining an energy function for the estimation error of the rotational angular velocity of each wheel as $V=\frac{1}{2}(\omega_i-\hat{\omega}_i)^2$ and differentiating and arranging it, as shown in Equation 20 below:

$$\dot{V} = \left(\dot{\omega}_i - \frac{r_{w,i}\hat{F}_{x,i} - T_{b,i} + T_s - r_{w,i}F_{rr}}{I_{\omega,i}}\right)(\omega_i - \hat{\omega}_i) \quad (20)$$

where V is an energy function for the estimation error, $\omega_i$ is the rotational angular velocity of each wheel, $\hat{\omega}_i$ is the estimated rotational angular velocity of each wheel, $r_{w,i}$ is the effective radius of each tire, $\hat{F}_{x,i}$ is the estimated longitudinal force of each tire, $T_{b,i}$ is the brake pressure of each wheel, $T_s$ is the propulsive torque applied to each wheel, $F_{rr}$ is rolling resistance, and $I_{\omega,i}$ is the rotational inertia of each tire.

The longitudinal force computation step S630 is the step of estimating the longitudinal force of each wheel while imposing a condition for making the estimation error be 0 on the above-described Equation 20, at which the estimated longitudinal force value of each wheel is computed using Equation 21 below while assuming $\dot{V}=-\eta(\omega_i-\hat{\omega}_i)^2$ to be the condition for making the estimation error of the rotational angular velocity be 0 and imposing it:

$$\hat{F}_{x,1} = \frac{1}{r_{\omega,i}}[I_{\omega,i}\{\dot{\omega}_i + \eta(\omega_i - \hat{\omega}_i)\} + T_{b,i} - T_s + r_{\omega,i}F_{rr}] \quad (21)$$

where $\hat{F}_{x,i}$ is the estimated longitudinal force of each tire, $r_{\omega,i}$ is the effective radius of each tire, $I_{\omega,i}$ is the rotational inertia of each tire, $\omega_i$ is the rotational angular velocity of each wheel, $\eta$ is an energy function variation coefficient for making the energy function for the estimation error to be 0 (which is set to a constant), $\hat{w}_i$ is the estimated rotational angular velocity of each wheel, $T_{b,i}$ is the brake pressure of each wheel, $T_s$ is the propulsive torque applied to each wheel, $F_{rr}$ is rolling resistance.

The friction coefficient estimator 700 is a component which estimates the friction coefficient between the tire and the road surface based on the above-described estimated slip ratio value, estimated normal force value, and estimated longitudinal force value of each wheel.

The map data 800 is a component which accumulates previously measured data in the form of a map.

The longitudinal force generated in the tire varies depending on various factors, such as the friction coefficient between the tire and the road surface, the slip ratio, the normal force, etc. For this reason, various models are being developed to represent the above situation quantitatively. Examples of the model are the brush tire model, etc. In the present invention, a normalized form of force which is obtained by dividing the tire longitudinal force by the normal force will be used to simply represent the relationships between the longitudinal force and the friction coefficient, the slip ratio, and the normal force. This may be expressed, as follows:

$$F_{x,i,n} = \frac{F_{x,i}}{F_{z,i}}, \text{ where } i = FL, FR, RL, RR$$

where $F_{x,i,n}$ is the normalized longitudinal force of the i-th wheel, $F_{x,i}$ is the longitudinal force of the i-th wheel, and $F_{z,i}$ is the normal force of the i-th wheel.

Furthermore, it is known that the normalized longitudinal force varies depending on the friction coefficient and the slip ratio. Accordingly, when previously measured data is accumulated in the form of a map, a corresponding value can be directly known.

Figure 3:
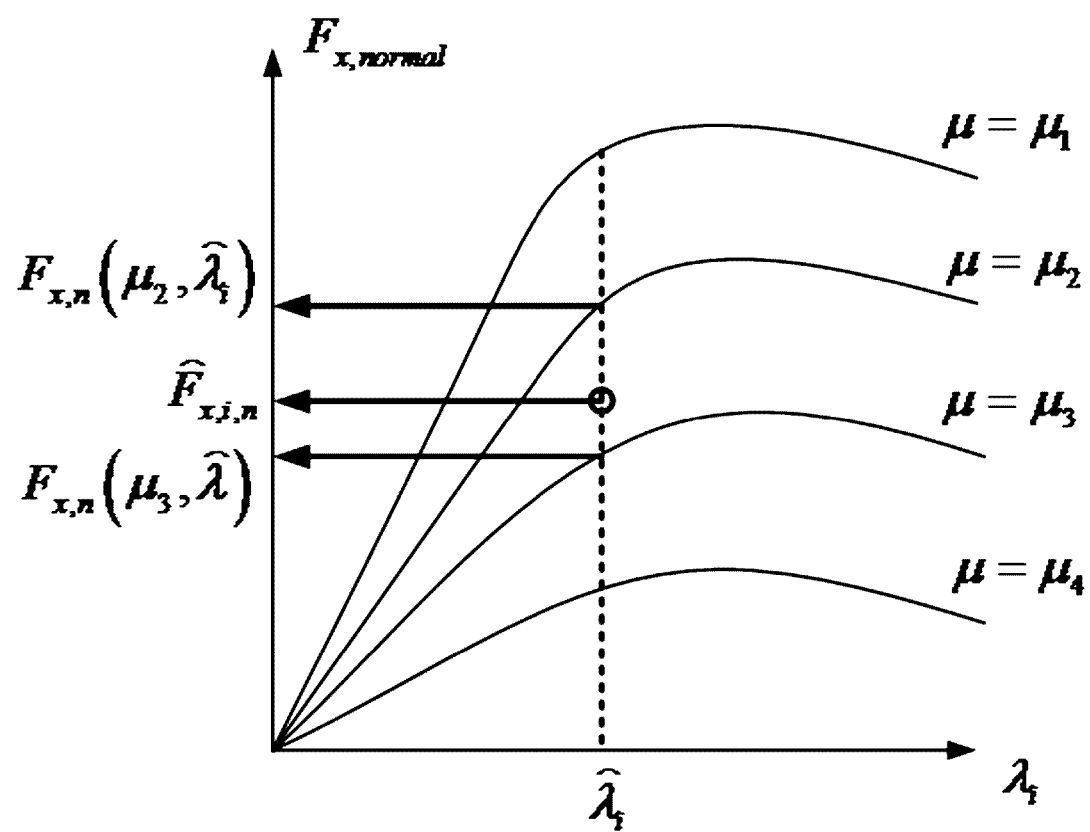
FIG. 3 is a graph showing the relationships between slip ratios, longitudinal forces, and friction coefficients accumulated in map data according to the present invention.

In the present invention, the relationship between the friction coefficient, the slip ratio, and the normalized tire longitudinal force is accumulated in the map data 800 in the form of map-type data, as shown in FIG. 3. This map data accumulates and holds values of the normalized longitudinal force according to the slip ratio for several typical situations ranging from a high friction coefficient environment to a low friction coefficient.

In this case, if the slip ratio, longitudinal force, and normal force of each wheel can be known in real time during the driving of the vehicle, the value of the road surface friction coefficient of the tire can be obtained based on the map information of the map data 800.

In this case, as to the parameters shown in FIG. 3, $\hat{\lambda}_i$ is the current estimated slip ratio of each wheel, $\hat{F}_{x,i}$ is the longitudinal force, $\hat{F}_{z,i}$ is the normal force, and $F_{x,n}(\mu_j,\hat{\lambda})$ is the normalized longitudinal force for the slip ratio $\hat{\lambda}_i$ and the friction coefficient $\mu=\mu_j$. In the map data 800, the maps for $\mu=\mu_1,\mu_2,\mu_3,\mu_4$ have been accumulated.

Figure 5:
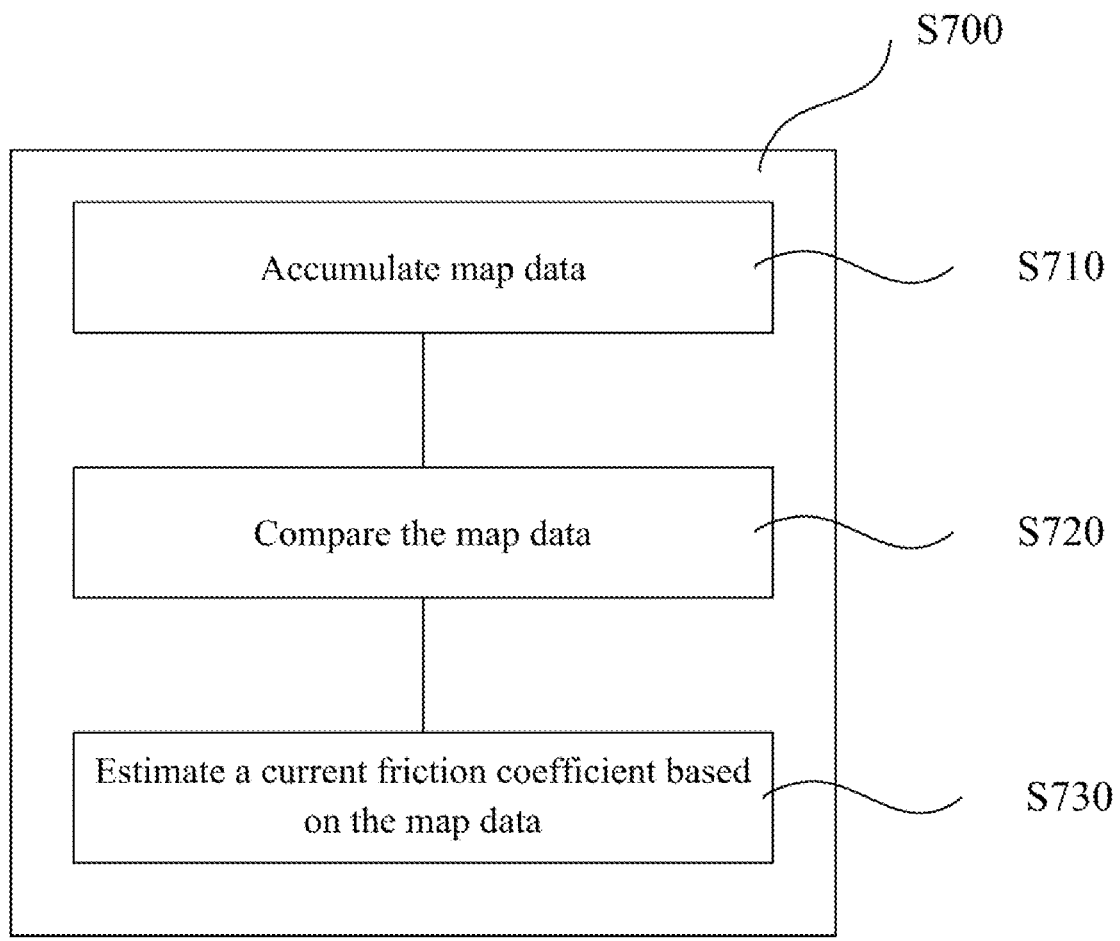
FIG. 5 is a block diagram showing the friction coefficient estimation step shown in FIG. 4.

In this case, referring to FIG. 3, as shown in the drawing, a normalized longitudinal force value for each friction coefficient, which is held for a currently estimated slip ratio by the map data, may be obtained. The current friction coefficient may be estimated by comparing the normalized longitudinal force value with currently estimated $\hat{F}_{x,i,n}$ and applying linear interpolation or extrapolation, as follows:

This algorithm may be expressed, as follows:

if $\hat{F}_{x,i,n} > F_{x,n}(\mu_1, \hat{\lambda})$ $\hat{\mu} = \mu_1 + \dfrac{\hat{F}_{x,i,n} - F_{x,n}(\mu_1, \hat{\lambda})}{F_{x,n}(\mu_1, \hat{\lambda}) - F_{x,n}(\mu_2, \hat{\lambda})}(\mu_1 - \mu_2)$ else if $F_{x,n}(\mu_{j+1}, \hat{\lambda}) > \hat{F}_{x,i,n} > F_{x,n}(\mu_j, \hat{\lambda}), j = 1, 2, 3$ $\hat{\mu} = \mu_{j+1} + \dfrac{\hat{F}_{x,i,n} - F_{x,n}(\mu_{j+1}, \hat{\lambda})}{F_{x,n}(\mu_j, \hat{\lambda}) - F_{x,n}(\mu_{j+1}, \hat{\lambda})}(\mu_j - \mu_{j+1})$ else if $\hat{F}_{x,i,n} < F_{x,n}(\mu_4, \hat{\lambda})$ $\hat{\mu} = \mu_4 - \dfrac{F_{x,n}(\mu_2, \hat{\lambda}) - \hat{F}_{x,i,n}}{F_{x,n}(\mu_3, \hat{\lambda}) - F_{x,n}(\mu_4, \hat{\lambda})}(\mu_3 - \mu_4)$ end In other words, the friction coefficient estimation step S700 may be performed to include a map data accumulation step S710, a map data comparison step S720, and a current friction coefficient estimation step S730, as shown in FIG. 5.

At the map data accumulation step S710, the normalized longitudinal force of each wheel is obtained by dividing the estimated longitudinal force value by the estimated normal force value, as described above, and is accumulated in the map data 800 along with the estimated slip ratio value and the estimated friction coefficient value.

At the map data comparison step S720, the current slip ratio estimated by the above-described slip ratio estimator 400 is compared with the cumulative value of the slip ratio held in the map data 800.

Furthermore, at the map data comparison step S720, a normalized longitudinal force value accumulated in the map data 800, as described above, is compared with a normalized longitudinal force value estimated by dividing a currently estimated longitudinal force value by an estimated normal force value.

At the current friction coefficient estimation step S730, the current friction coefficient is estimated based on the cumulative value of the slip ratio compared with the current slip ratio, and the estimated friction coefficient is accumulated in the map data 800.

Meanwhile, the longitudinal force is not large in a region where the slip ratio is small, and thus there is a limitation to the estimation of the friction coefficient based thereon. Accordingly, the estimated friction coefficient can be relied on only when the slip ratio is equal to or larger than a threshold value. Furthermore, there is a limitation on the use of a friction coefficient value estimated in real time due to factors, such as a sensor error, a difference between the map data and an actual value, and the like. Accordingly, it is preferable to accumulate N values of the most recently estimated friction coefficient values, corresponding to situations where the size of the slip ratio at the time is larger than a previously set threshold value, and to use the average of the N values as the estimated value. This may be expressed by the following algorithm:

for $\hat{\mu}=\hat{\mu}(k), \hat{\lambda}=\hat{\lambda}(k), \text{DataSet}_N=[\hat{\mu}_1, \hat{\mu}_2, \ldots, \hat{\mu}_N]$ if $\hat{\lambda}(k) > \lambda_{th}$ $\text{DataSet}_N = [\hat{\mu}(k), \hat{\mu}_1, \hat{\mu}_2, \ldots \hat{\mu}_{N-1}]$ end $\hat{\mu}_{avg} = \text{mean}\{\text{DataSet}_N\}$ As described above, in the method and device for estimating the road surface friction coefficient of a tire according to the present invention, a friction coefficient is estimated using longitudinal propulsive force generated in a high-speed driving environment, and thus the road surface friction coefficient of a tire may be estimated even in a state in which additional pressure, such as braking, steering, or the like, is minimized or is not present. In particular, map data is constructed based on information about the slip ratios, normal forces, and longitudinal forces of each wheel estimated from state information based on the sensor values of a vehicle or specifications, and current friction coefficient information is estimated using the map data, so that the reliability and accuracy of the estimation may be expected.

Meanwhile, in connection with the term " . . . units" used in the embodiments of the present invention, a function provided by components and " . . . units" may be combined with a smaller number of components and " . . . units," or may be separated from additional components and " . . . units."

The foregoing description of the present invention is intended merely for the purpose of illustration. It will be appreciated by those having ordinary knowledge in the art to which the present invention pertains that the present invention can be easily modified in other specific forms without changing the technical spirit and essential features of the present invention. Accordingly, the above-described embodiments are should be understood as being illustrative and not limitative in every aspect. For example, each component described as being in a single form may be practiced in a distributed form and, in the same manner, components described as being in a distributed form may be practiced in an integrated form.

The scope of the present invention is defined by the following claims, rather than the foregoing detailed description. All variations and modifications derived from the meanings and scopes of the claims and concepts equivalent thereto should be construed as being included in the scope of the present invention.

The invention claimed is:

1. A method for estimating a road surface friction coefficient of a tire, the method estimating a road surface friction coefficient of a tire mounted on a wheel of a vehicle in a state in which the vehicle is running, the method comprising:
   acquiring state information of a vehicle including at least one of engine state information, transmission state information, and chassis state information from sensors mounted on the vehicle and specifications set for the vehicle;
   estimating a longitudinal slip ratio, normal force, and longitudinal force for each tire mounted on each wheel of the vehicle by using the acquired state information of the vehicle; and
   estimating a road surface friction coefficient for the tire by using the estimated longitudinal slip ratio, normal force, and longitudinal force,
   wherein estimating the friction coefficient comprises:
   accumulating an estimated longitudinal force value, an estimated normal force value, and an estimated longitudinal slip ratio value in a form of map data, and estimating a current friction coefficient based on a cumulative data,
   wherein estimating the friction coefficient comprises:
   a map data accumulation step of deriving normalized longitudinal force of each wheel by dividing the estimated longitudinal force value by the estimated normal force value and then accumulating the normalized longitudinal force, together with the estimated slip ratio value and the estimated friction coefficient value, as the map data;
   a map data comparison step of comparing the slip ratio currently estimated at the slip ratio estimation step with the cumulative slip ratio value accumulated in the map data; and
   a step of estimating the current friction coefficient based on a cumulative value of the normalized longitudinal force corresponding to the cumulative slip ratio value compared at the map data comparison step,
   the step of estimating the current friction coefficient comprises:
   accumulating a predetermined number (N) of the most recently estimated friction coefficient values, corresponding to situations where each slip ratio used for estimating is larger than a previously set threshold value; and
   estimating an average of the accumulated N of friction coefficient values to be the current friction coefficient.

2. The method of claim 1, wherein estimating the current friction coefficient comprises:
   utilizing linear interpolation or extrapolation while comparing the cumulative value of the normalized longitudinal force with the longitudinal force currently estimated at the longitudinal force estimation step.

3. The method of claim 1, wherein estimating the longitudinal slip ratio, the normal force, and the longitudinal force comprises:
a speed estimation step of estimating a longitudinal velocity and lateral velocity of the vehicle based on the state information of the vehicle;
a vehicle mass & grade estimation step of estimating a mass of the vehicle and a grade of a road based on the state information of the vehicle;
a slip ratio estimation step of estimating a longitudinal slip ratio of each wheel based on the state information of the vehicle, the longitudinal velocity of the vehicle, and the lateral velocity of the vehicle;
a normal force estimation step of estimating normal force applied to each wheel based on the state information of the vehicle, an estimated value mass of the vehicle, and an estimated grade value of the road; and
a longitudinal force estimation step of estimating longitudinal force of each wheel based on the state information of the vehicle.

4. The method of claim 3, wherein the vehicle mass & grade estimation step comprises:
a resistance computation step of obtaining force generated due to air resistance attributable to movement of the vehicle and longitudinal force generated in the vehicle due to the grade of the road;
a linear transformation step of transforming the mass of the vehicle and the grade of the road into linear forms by using the force generated due to air resistance attributable to the movement of the vehicle and the longitudinal force generated in the vehicle due to the grade of the road; and
a vehicle mass & grade computation step of estimating the mass of the vehicle and the grade of the road, transformed into the linear forms at the linear transformation step, by using a least squares method.

5. The method of claim 3, wherein the slip ratio estimation step comprises:
a wheel velocity computation step of obtaining longitudinal velocity and lateral velocity of a center of each wheel based on the state information of the vehicle and the longitudinal velocity and lateral velocity estimated at the speed estimation step;
a slip angle computation step of obtaining a lateral slip angle of each wheel; and
a slip ratio computation step of obtaining the slip ratio of each wheel based on the longitudinal velocity, the lateral velocity, and the lateral slip angle for each wheel.

6. The method of claim 3, wherein the normal force estimation step comprises:
a load transfer computation step of obtaining longitudinal load transfer and lateral load transfer of each wheel based on the state information of the vehicle and the mass of the vehicle and grade of the road estimated at the vehicle mass & grade estimation step; and
a normal force computation step of estimating the normal force applied to each wheel by using the longitudinal load transfer and the lateral load transfer.

7. The method of claim 3, wherein the longitudinal force estimation step comprises:
a rotational angular velocity estimation step of estimating rotational angular velocity of each wheel based on the state information of the vehicle;
an energy function computation step of obtaining an energy function for an estimation error of the rotational angular velocity; and
a longitudinal force computation step of estimating the longitudinal force of each wheel while imposing a condition for making the estimation error be 0,
wherein the energy function for the estimation error of the rotational angular velocity is as follows $$V = \frac{1}{2}(\omega_i - \hat{\omega}_i)^2$$

$\omega_i$ is the rotational angular velocity of each wheel, $\hat{\omega}_i$ is the estimated rotational angular velocity of each wheel.

8. A device for estimating a road surface friction coefficient of a tire, the device estimating a road surface friction coefficient of a tire in a state in which a vehicle is normally running at high speed, the device comprising:
an information provider configured to receive and provide engine state information, transmission state information, or chassis state information of a vehicle from sensors mounted on the vehicle and specifications set for the vehicle;
a vehicle speed estimator configured to estimate longitudinal velocity and lateral velocity of the vehicle based on state information of the vehicle provided by the information provider;
a vehicle mass & grade estimator configured to estimate a mass of the vehicle and a grade of a road based on state information of the vehicle provided by the information provider;
a slip ratio estimator configured to estimate slip ratio of each wheel based on the state information of the vehicle provided by the information provider and an estimated longitudinal velocity value and estimated lateral velocity value of the vehicle estimated by the vehicle speed estimator;
a normal tire force estimator configured to estimate normal force applied to each wheel based on the state information of the vehicle provided by the information provider and an estimated mass value of the vehicle and an estimated grade value of the road estimated by the vehicle mass & grade estimator;
a longitudinal tire force estimator configured to estimate longitudinal force of each wheel based on rotational angular velocity of each wheel, braking pressure, and propulsive torque based on engine torque provided by the information provider; and
a friction coefficient estimator configured to estimate a road surface friction coefficient of a tire based on an estimated longitudinal force value of each wheel estimated by the longitudinal tire force estimator, an estimated normal force value of each wheel estimated by the normal tire force estimator, and an estimated slip ratio value of each wheel estimated by the slip ratio estimator,
wherein the friction coefficient estimator accumulates the estimated longitudinal force value, the estimated normal force value, and the estimated slip ratio value in a form of map data, and estimates a current friction coefficient based on a cumulative data,
wherein the friction coefficient estimator accumulates the map data by deriving normalized longitudinal force of each wheel by dividing the estimated longitudinal force value by the estimated normal force value and then accumulating the normalized longitudinal force, together with the estimated slip ratio value and the estimated friction coefficient value, as the map data, wherein the friction coefficient estimator compares the slip ratio currently estimated with the cumulative slip ratio value accumulated in the map data, wherein the friction coefficient estimator estimates the current friction coefficient based on a cumulative value of the normalized longitudinal force corresponding to the cumulative slip ratio value accumulated in the map data, wherein the friction coefficient estimator estimates the current friction coefficient by accumulating a predetermined number (N) of the most recently estimated friction coefficient values, corresponding to situations where each slip ratio used for estimating is larger than a previously set threshold value, and estimating an average of the accumulated N of friction coefficient values to be the current friction coefficient.

* * * * *